G. ST. B. S. WATKINS.
SPINNING BAIT FOR FISHING PURPOSES.
APPLICATION FILED AUG. 24, 1921.

1,420,228.

Patented June 20, 1922.

UNITED STATES PATENT OFFICE.

GUY ST. BARBE SLADEN WATKINS, OF DAVIOT, SCOTLAND.

SPINNING BAIT FOR FISHING PURPOSES.

1,420,228. Specification of Letters Patent. Patented June 20, 1922.

Application filed August 24, 1921. Serial No. 494,877.

(GRANTED UNDER THE PROVISIONS OF THE ACT OF MARCH 3, 1921, 41 STAT. L., 1313.)

*To all whom it may concern:*

Be it known that I, GUY ST. BARBE SLADEN WATKINS, a subject of the King of Great Britain, residing at Daviot, Inverness-shire, Scotland, have invented new and useful Improvements in Spinning Baits for Fishing Purposes (for which I have filed an application in Great Britain October 9, 1919, Patent Number 153,443), of which the following is a specification.

My invention relates to spinning baits as employed for fishing purposes, of the kind in which means are provided for varying or reversing the pitch of the blades or vanes employed to cause the spinning, thereby to render the bait suitable for use in streams of different velocities, and also to facilitate taking out such twist as may occur in the line through imperfect action of the swivel joint.

According to my invention, the blades or vanes are constituted by a plurality of radially disposed projections carried by members (such as rings or washers) which are angularly movable relatively to one another around the rotational axis of the bait. These members preferably are mounted so as to be in frictional contact with the body of the bait, and preferably also with one another. By this arrangement the rings can be moved relatively to one another, so that the projections follow a helical path along the body of the bait and thus may have either a right handed or left handed inclination, and a fine or a coarse pitch as may be desired.

The manner of carrying out the invention is illustrated in the accompanying drawing, in which—

Figure 1:
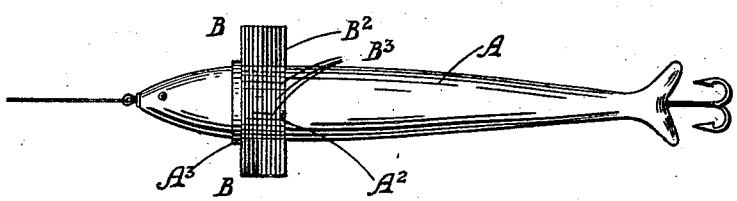
Figure 2:
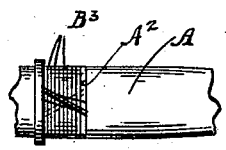
Figure 3:
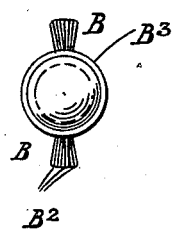

Figure 1 is a side elevation showing the application to a "minnow" type of bait, of which Figures 2 and 3 are respectively plan and end views of the vane-carrying portion.

Like letters indicate like parts throughout the drawing.

Upon the artificial minnow A, or the like, vanes B are constituted by radially-disposed projections $B^2$ on the outer periphery of a relatively narrow ring or washer $B^3$. A plurality of these rings $B^3$, each carrying the projections $B^2$, (preferably two in number and situated opposite to one another) are employed and all the rings $B^3$ are conveniently sunk, in close contact with one another, in a circumferential groove $A^2$ in the body of the minnow, so that only the projections $B^2$ forming the vanes protrude therefrom. The rings $B^3$ have sufficient frictional contact with one another and with the sides of the groove $A^2$ to remain in any position in which they are turned angularly in the groove, but if desired one side of the groove may be constituted by the ring nut $A^3$. Thus when the rings $B^3$ are so disposed that their projections $B^2$ are in line with one another lengthwise of the minnow, they are in a neutral position, but by giving each ring a slight angular turn with reference to the adjacent ring, a helically disposed vane is constituted by the projections $B^2$, which may obviously follow either a right or left-handed helix, and may be given either a relatively fine or coarse pitch.

Obviously, the thinner the rings $B^3$ and the projections they carry, the more perfect will be the helices formed, but in practice and without detriment to their action they may be made of a thickness to permit of their being handled without fear of damage to them.

I claim as my invention:

1. In a spinning bait for fishing purposes, the combination of a rotational body part, and a plurality of radially extending fine projections in frictional contact and capable of being adjusted angularly around the rotational axis of the said body part relative to each other so as to be formed into either a right or left-handed helix of any desired pitch.

2. In a spinning bait for fishing purposes, the combination of a rotational body part, a plurality of rings mounted side by side upon the said body part, so as to be angularly adjustable relative to each other in either circumferential direction, and projections carried by the said rings radially extending therefrom, the said projections, by the angular adjustment of the said rings being adapted to form a right or left-handed helix of any desired pitch.

3. In a spinning bait for fishing purposes, the combination of a rotational body part provided with a circumferential groove, a plurality of adjustable rings mounted in the said groove in frictional contact with each other and with the sides of the groove, and projections radially extending from the said rings, the said projections constituting vanes adapted by the angular adjustment of the said rings to form a right or left handed helix of any desired pitch.

In testimony whereof I have signed my name to this specification in the presence of two subscribing witnesses.

GUY ST. BARBE SLADEN WATKINS.

Witnesses:
D. F. MACDONALD,
ROB. GROAT.